US011889596B2

(12) United States Patent
Hung

(10) Patent No.: US 11,889,596 B2
(45) Date of Patent: Jan. 30, 2024

(54) ELECTRICAL CONNECTING PORTION FOR A DEVICE WITH A HEATING FUNCTION

(71) Applicant: MIN HSIANG CORPORATION, Tainan (TW)

(72) Inventor: Jui-Hung Hung, Kaohsiung (TW)

(73) Assignee: MIN HSIANG CORPORATION, Tainan (TW)

( * ) Notice: Subject to any disclaimer, the term of this patent is extended or adjusted under 35 U.S.C. 154(b) by 686 days.

(21) Appl. No.: 16/943,082

(22) Filed: Jul. 30, 2020

(65) Prior Publication Data

US 2022/0039208 A1 Feb. 3, 2022

(51) Int. Cl.

| | |
|---|---|
| ***H01R 13/03*** | (2006.01) |
| ***H05B 3/03*** | (2006.01) |
| ***H05B 3/06*** | (2006.01) |
| ***F21S 45/60*** | (2018.01) |
| ***H05B 3/84*** | (2006.01) |

(52) U.S. Cl.

CPC ................ *H05B 3/03* (2013.01); *F21S 45/60* (2018.01); *H05B 3/84* (2013.01); *H05B 3/06* (2013.01); *H05B 2203/016* (2013.01)

(58) Field of Classification Search

None

See application file for complete search history.

(56) References Cited

U.S. PATENT DOCUMENTS 5,444,228 A * 8/1995 Gelus ....................... H05B 3/30 219/541
8,459,848 B2 * 6/2013 Marley ................... F21S 45/60 362/520
8,899,803 B2 12/2014 Marley
9,709,238 B2 7/2017 Dunn et al.
10,364,954 B2 7/2019 Deering
10,374,343 B2 * 8/2019 Schmalbuch ............ H01R 4/06
10,398,601 B2 * 9/2019 Cornelius ................. A61F 9/02
10,873,143 B2 * 12/2020 Schmalbuch ........ H01R 12/718
2012/0086614 A1 * 4/2012 Droste ................. H01Q 1/1278 29/846

(Continued)

FOREIGN PATENT DOCUMENTS

EP 671864 A2 * 9/1995 ............... H05B 3/84
TW 509452 U 11/2002
TW M478310 U 5/2014

*Primary Examiner* — Joseph M. Pelham

(74) *Attorney, Agent, or Firm* — Best & Flanagan LLP

(57) ABSTRACT

An electrical connecting portion for a device with a heating function is a portion of a heating unit of the device. The electrical connecting portion includes a substrate, two copper layers, and two electrically conductive coating layers. The substrate is made of a light-transmittable material and includes a front face and a rear face. Each of the two copper layers includes at least one first through-hole extending in a front-rear direction. Each of the two electrically conductive coating layers substantially covers a respective one of the two copper layers and is coupled to the front face of the substrate. Each of the two electrically conductive coating layers substantially fills the at least one first through-hole of the respective one of the two copper layers. The two electrically conductive coating layers have an insulating spacing therebetween. Thus, the electrical connecting portion prevents hot melting and provides better electrical connection reliability.

17 Claims, 12 Drawing Sheets

(56) References Cited

U.S. PATENT DOCUMENTS

| | | | | |
|---|---|---|---|---|
| 2015/0296569 | A1* | 10/2015 | Rateiczak | H05B 3/06<br>219/541 |
| 2015/0296615 | A1* | 10/2015 | Schmalbuch | H05K 1/09<br>174/257 |
| 2017/0033481 | A1* | 2/2017 | Schmalbuch | H01R 12/718 |
| 2019/0174582 | A1* | 6/2019 | Guignard | B32B 17/10174 |
| 2019/0326691 | A1* | 10/2019 | Schmalbuch | H05B 3/84 |
| 2021/0148539 | A1* | 5/2021 | Ting | F21S 41/148 |
| 2022/0039208 | A1* | 2/2022 | Hung | H05B 3/84 |

* cited by examiner

ELECTRICAL CONNECTING PORTION FOR A DEVICE WITH A HEATING FUNCTION

BACKGROUND OF THE INVENTION

The present invention relates to an electrical connecting portion for a device with a heating function and, more particularly, to an electrical connecting portion for increasing heat-resistant reliability.

Head lamps, tail lamps, turn signals, fog lamps, etc. are generally disposed on transportation and provide illumination and/or alarming effect. In a snowing condition, snow piles on the surface of a lens of a vehicle lamp and, thus, blocks the outputted light beams. Heating devices have now been provided to heat the lens of the vehicle lamp.

U.S. Pat. Nos. 8,459,848; 8,899,803; 9,709,238; and 10,364,954 disclose vehicle lamps including a heating element on a lens. The heating element can be an electrically conductive metal coating, copper, or transparent conductive oxide and can be linearly distributed on a surface of the lens of the vehicle lamp. The heating element includes an electrical connecting end electrically connected to a circuit board. The heating element generates heat energy to heat the lens of the vehicle lamp through conduction by the electrical connecting end.

Since a larger heat energy is generated at an interconnection between the electrical connecting end of the electrically conductive coating and the circuit board after electrical conduction, the electrically conductive coating at the electrical connecting end is apt to hot melt, leading to a bad connection and unstable electrical conduction, thereby adversely affecting heating of the lens of the vehicle lamp.

BRIEF SUMMARY OF THE INVENTION

An objective of the present invention is to provide an electrical connecting portion for increasing heat-resistant reliability.

An electrical connecting portion for a device with a heating function according to the present invention is a portion of a heating unit of the device. The electrical connecting portion comprises a substrate, two copper layers, and two electrically conductive coating layers. The substrate is made of a light-transmittable material and includes a front face and a rear face. Each of the two copper layers includes at least one first through-hole extending in a front-rear direction. Each of the two electrically conductive coating layers substantially covers a respective one of the two copper layers and is coupled to the front face of the substrate. Each of the two electrically conductive coating layers substantially fills the at least one first through-hole of the respective one of the two copper layers. Furthermore, the two electrically conductive coating layers have an insulating spacing therebetween. The two electrically conductive coating layers are electrically connected to a heating element of the heating unit of the device. The device according to the present invention can be a vehicle lamp, a dashboard, or an alarm sign.

A method is provided for producing the electrical connecting portion of a device with a heating function according to the present invention. The electrical connecting portion is a portion of the heating unit of the device. The method includes the following steps.

In step S1, a substrate is provided. The substrate is transmittable to light and includes a front face and a rear face.

In step S2, two electrically conductive coating layers are disposed. A portion of each of the two electrically conductive coating layers is disposed on the front face of the substrate. After curing, an insulating spacing is formed between the two electrically conductive coating layers, and the two electrically conductive coating layers are electrically connected to a heating element of the heating unit of the device.

In step S3, two copper layers are disposed. Each of the two copper layers has at least one first through-hole extending in the front-rear direction and is disposed on a portion of a respective one of the two electrically conductive coating layers.

In step S4, another portion of each of the two electrically conductive coating layers is disposed on the respective copper layer and substantially fills the at least one through-hole of the respective copper layer. After curing, each of the two copper layers is substantially covered by the respective electrically conductive coating layer.

In an embodiment of the electrical connecting portion according to the present invention, the electrical connecting portion is a portion of a heating unit of the device. The electrical connecting portion comprises a substrate made, two electrically conductive coating layers, and two copper layers. The substrate is made of a light-transmittable material and includes a front face and a rear face. Each of the two electrically conductive coating layers is disposed on the front face of the substrate, and the two electrically conductive coating layers have an insulating spacing therebetween after curing. The two electrically conductive coating layers are electrically connected to a heating element of the heating unit of the device. Furthermore, each of the two copper layers is disposed on a front face of a respective one of two electrically conductive coating layers.

In an example, each of the two electrically conductive coating layers and the substrate have aligned through-holes extending in the front-rear direction, and a fastener extends through the aligned through-holes.

In an embodiment according to the present invention, the electrical connecting portion further comprises two electrical terminals and a fixing member. The fixing member fixes a relative position between the two electrical terminals. Each of the two electrical terminals is disposed on the front face of the respective one of the two electrically conductive coating layers. Furthermore, each of the two electrical terminals, the fixing member, the respective one of the two electrically conductive coating layers, and the substrate have aligned through-holes, and a fastener extends through the aligned through-holes.

The two copper layers of the electrical connecting portion according to the present invention can be more stably coupled to the two electrically conductive coating layers, respectively. Furthermore, the two copper layers and the two electrically conductive coating layers can be respectively connected to the positive electrode and the negative electrode of the power input of the circuit board. Since the two copper layers of the electrical connecting portion according to the present invention are excellent conductors, after the electrical connecting portion is electrically connected, the current flows into the two copper layers and the two electrically conductive coating layers and then flows into the heating element. By the above diversion mechanism, the two copper layers are electrically conductive and reduce the current flowing through the two electrically conductive coating layers to reduce the heat generated by the two electrically conductive coating layers. This prevents hot melting of the two electrically conductive coating layers to thereby increase the electrical connection stability while avoiding bad contact.

The present invention will become clearer in light of the following detailed description of illustrative embodiments of this invention described in connection with the drawings.

DETAILED DESCRIPTION OF THE INVENTION

Figure 1:
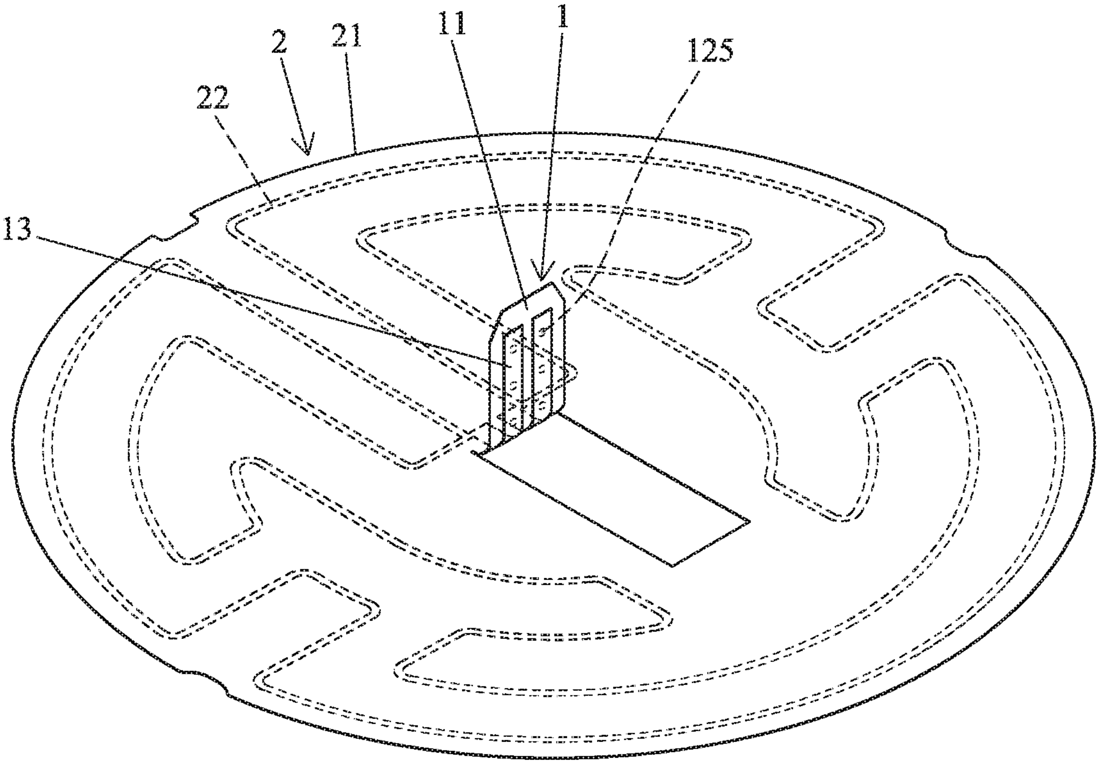
FIG. 1 is a perspective view of a heating unit for a device with a heating function of a first embodiment according to the present invention.
Figure 2:
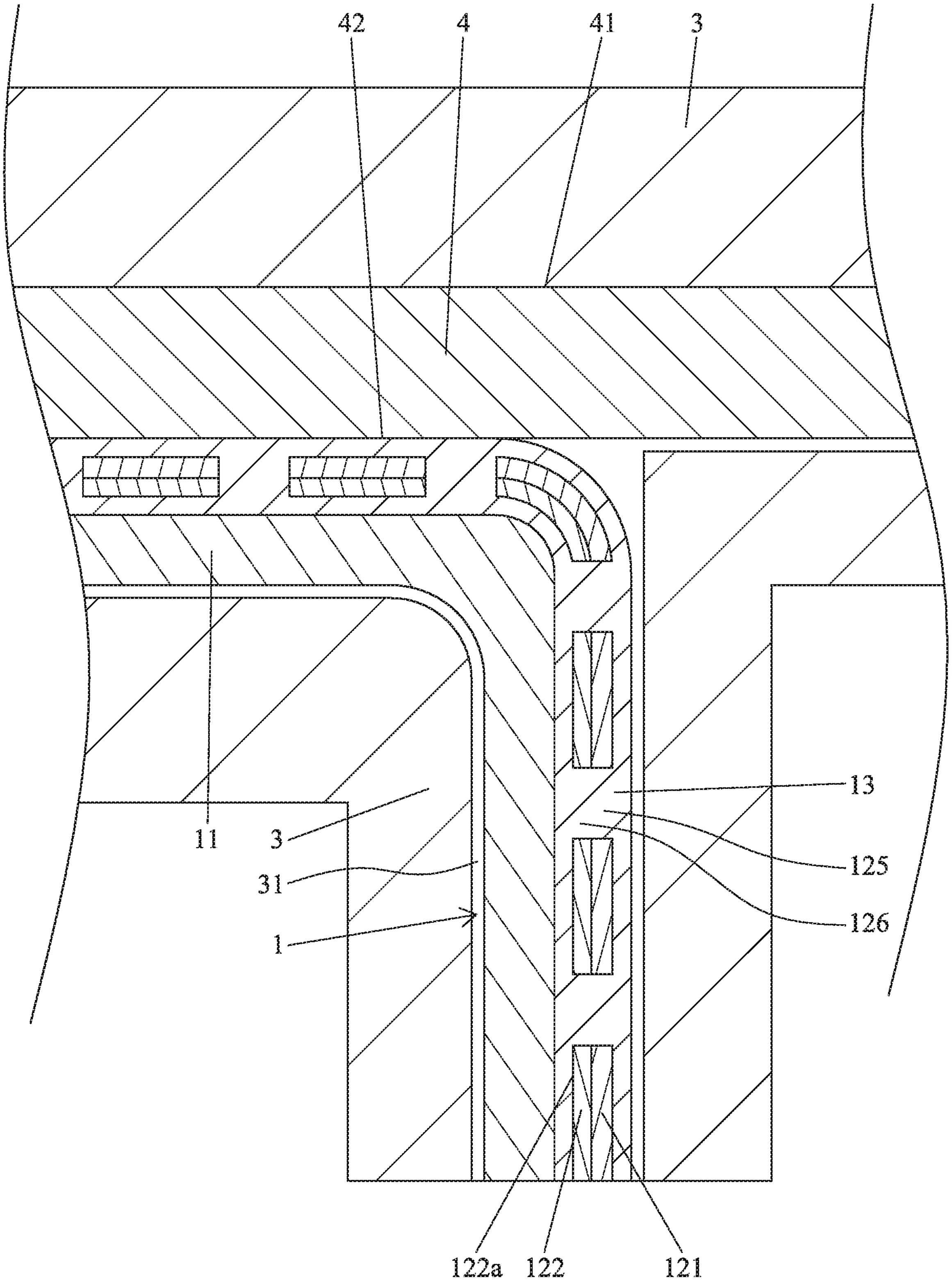
FIG. 2 is a diagrammatic cross sectional view illustrating formation and coupling of a lens and the heating unit of the first embodiment according to the present invention.
Figure 3:
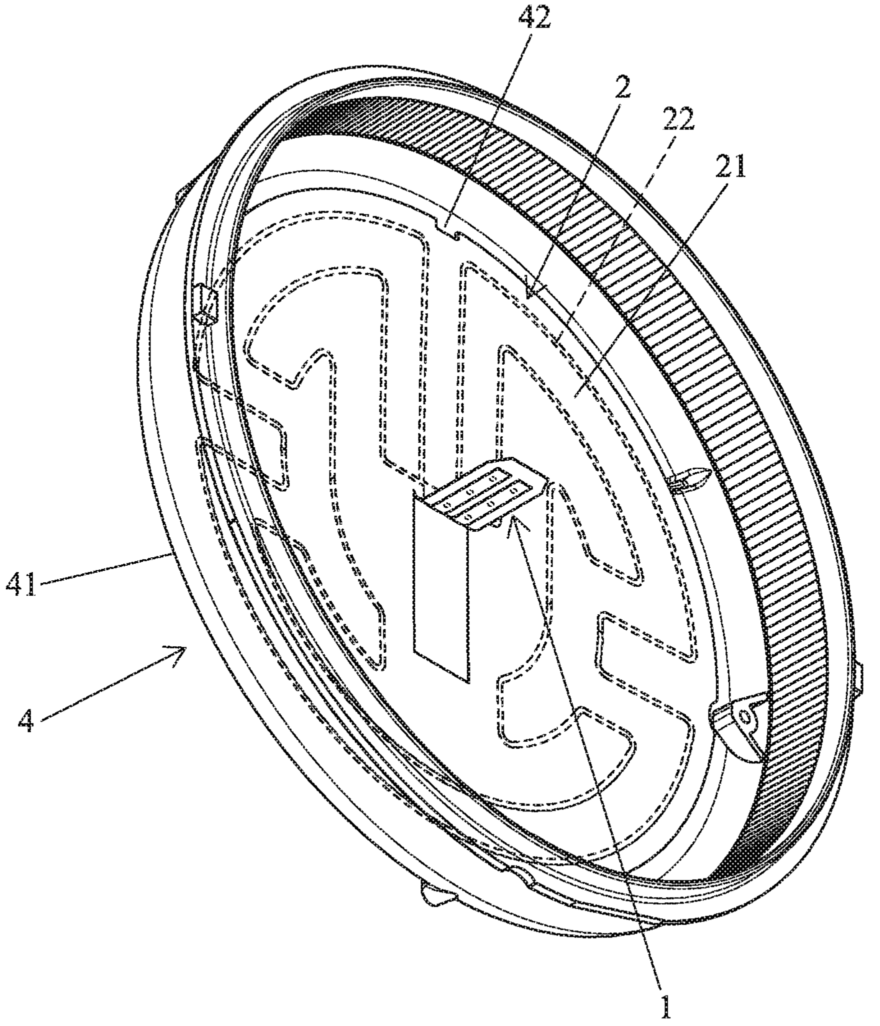
FIG. 3 is a perspective view illustrating formation of the lens and the heating unit of the first embodiment according to the present invention.
Figure 4:
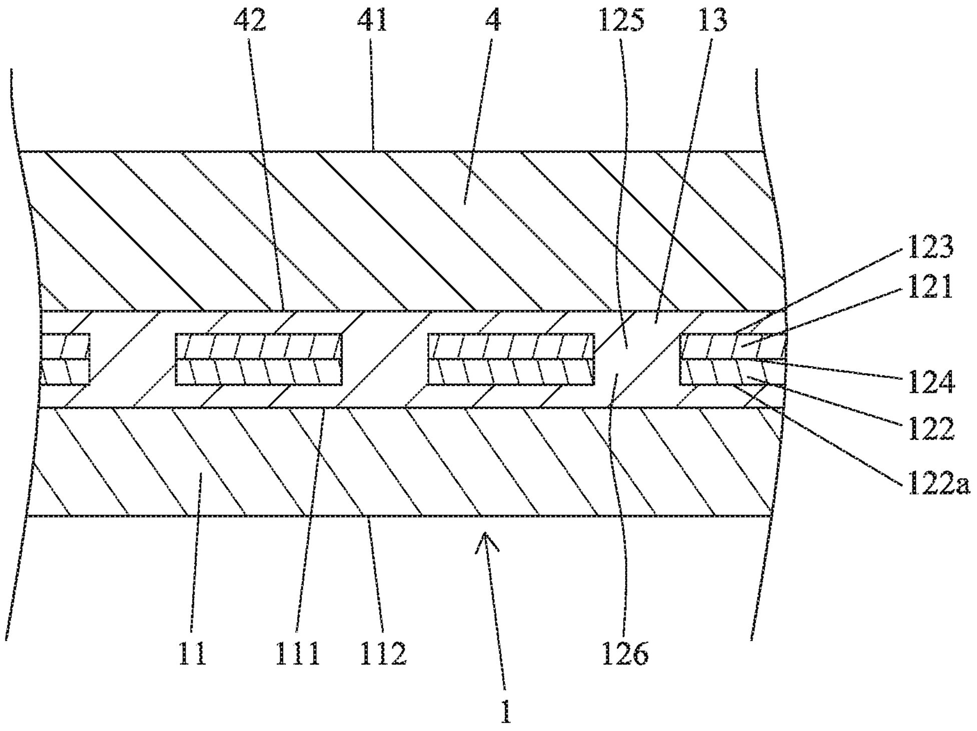
FIG. 4 is diagrammatic cross sectional view illustrating coupling of the lens and the heating unit of the first embodiment according to the present invention.
Figure 5:
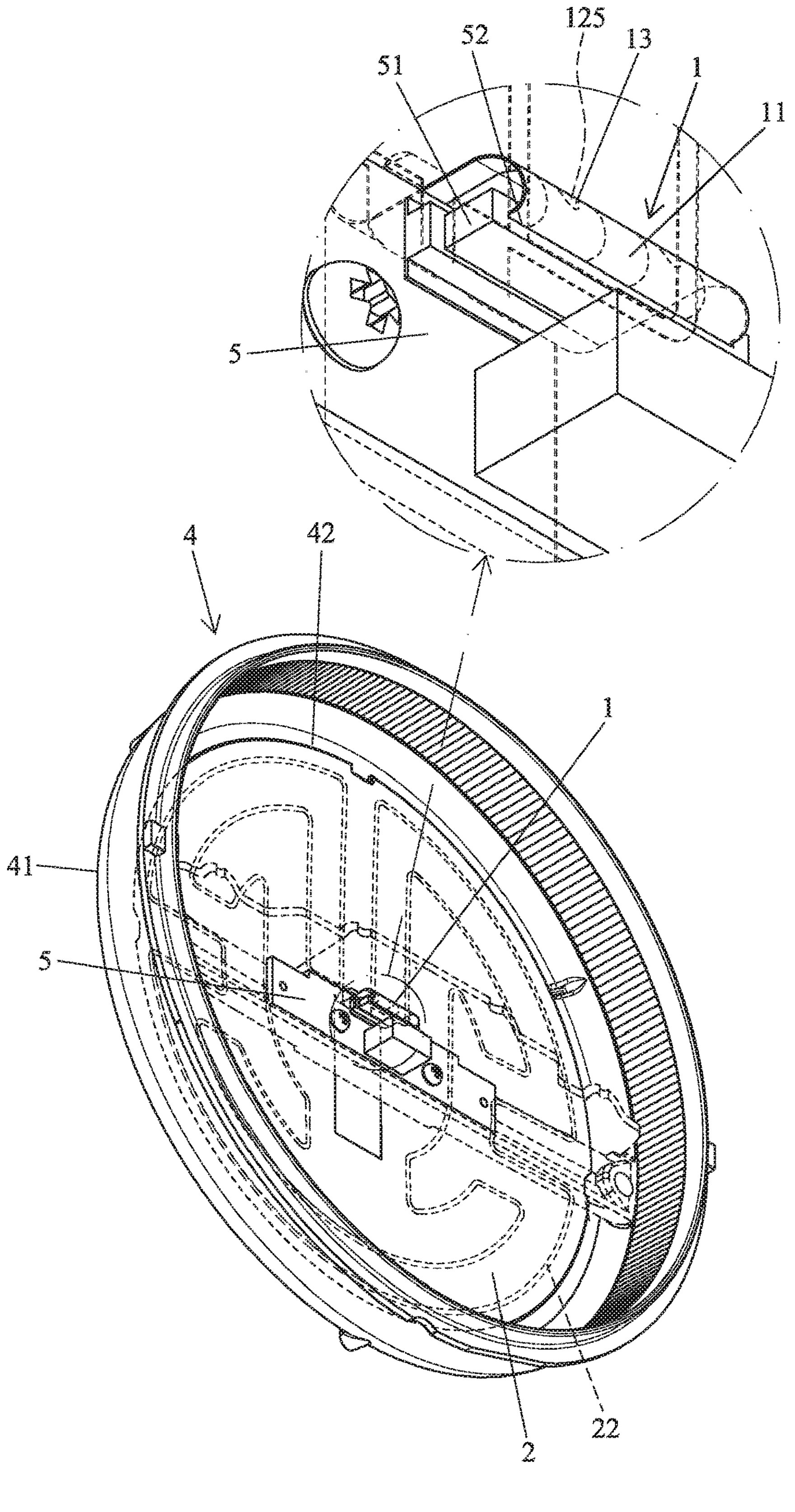
FIG. 5 is a perspective view illustrating connection of an electrical connecting portion of the device with the heating function of the first embodiment according to the present invention.

Where used in the various figures of the drawings, the same numerals designate the same or similar parts. FIG. 1 is a perspective view of a heating unit for a device with a heating function of a first embodiment according to the present invention. FIG. 2 is a diagrammatic cross sectional view illustrating formation and coupling of a lens and the heating unit of the first embodiment according to the present invention. FIG. 3 is a perspective view illustrating formation of the lens and the heating unit of the first embodiment according to the present invention. FIG. 4 is a diagrammatic cross sectional view illustrating coupling of the lens and the heating unit of the first embodiment according to the present invention. FIG. 5 is a perspective view illustrating connection of an electrical connecting portion of the device with the heating function of the first embodiment according to the present invention. With reference to FIGS. 1-5, the electrical connecting portion 1 of the first embodiment according to the present invention is a portion of a heating unit 2 of the device. The device can be, but not limited to, a vehicle lamp, a dashboard, or an alarm sign. Any devices requiring melting snow, removing frost, or removing fog are all within the scope of "device" according to the present invention. Hereinafter, vehicle lamps will be described as best or preferred embodiments of the present invention without any intention of restriction. The electrical connecting portion 1 includes a substrate 11, two copper layers 121, two glue layer 122, and two electrically conductive coating layers 13. The substrate 11 is made of a light-transmittable material, such as polycarbonate (PC), polymethyl methacrylate (PMMA), etc. The substrate 11 has certain flexibility and includes a front face 111 and a rear face 112. Furthermore, the electrical connecting portion 1 according to the present invention can be, but not limited to, an electrical connection terminal or an electrical connection wire.

Additionally, the electrical connecting portion 1 according to the present invention can be in the form of at least one single-wire structure, such as a copper layer 121, an electrically conductive coating layer 13, and a glue layer 122. Preferably, as can be seen in the first and second embodiments according to the present invention, the electrical connecting portion 1 is of a dual-wire structure and can, but not limited to, be used as a positive electrode and a negative electrode. In unrestricted alternative embodiments, the electrical connecting portion 1 is of a single-wire structure and is used with copper plates in the third embodiment according to the present invention or an electrical terminal in the fourth embodiment according to the present invention.

Each of the two copper layers 121 has a front face 123 and a rear face 124. Furthermore, each of the two copper layers 121 has at least one first through-hole 125 extending in a front-rear direction. In this embodiment, the at least one through-hole 125 is circular in cross section (see FIG. 3). Additionally, the term "through-hole" (including "through-hole", "first through-hole", "second through-hole", etc.) used herein can be a closed through-hole, such as circular, annular, channel-like, etc. In other embodiments (not shown), the through-hole can be a semi-closed through-hole and is located on a side of the two copper layers 121 (and/or the two glue layers 122) to present a pattern of semi-circular, U-shaped, V-shaped, etc. Nevertheless, the present invention is not limited in this regard.

Each of the two glue layers 122 is located between a respective one of the two copper layers 121 and a respective one of the two electrically conductive coating layers 13. Each of the two glue layers 122 is coupled to the rear face 124 of the respective cooper layer 121. Furthermore, each of the two glue layers 122 includes at least one second through-hole 126 extending in the front-rear direction and intercommunicating with the at least one first through-hole 125. In this embodiment, the shape of the at least one second through-hole 126 is identical or similar to the shape of the at least one first through-hole 125 or is different from the shape of the at least one first through-hole 125.

Each of the two electrically conductive coating layers 13 can be electrically conductive silver paste or other metal in a liquid form. Each of the two electrically conductive coating layers 13 substantially covers the respective copper layer 121 and is coupled to the front face 111 of the substrate 11. Furthermore, each of the two electrically conductive coating layers 13 substantially fills the at least one first through-hole 125 of the respective copper layer 121 and the at least one second through-hole 126 of the respective glue layer 122. Furthermore, an insulating spacing is defined between the two electrically conductive coating layers 13. The term “substantially covers” used herein means complete covering or partial covering. However, the present invention is not limited in this regard. Furthermore, the term “substantially fills” used herein means complete filling or partial filling, such that a portion of the respective electrically conductive coating layer 13 contiguous to the front face 123 of the respective copper layer 121 can be in electrical connection with a portion of the respective electrically conductive coating layer 13 contiguous to a rear face 122*a* of the respective glue layer 122. Nevertheless, the present invention is not limited in this regard.

The heating unit 2 of the device according to the present invention includes a substrate 21, a heating element 22, and the electrical connecting portion 1. The substrate 21 of the heating element 2 is connected to the substrate 11 of the electrical connecting portion 1. A portion of the substrate 21 corresponding to the electrical connecting portion 1 permits the electrical connecting portion 1 to bend rearwards. Both the heating element 22 and the electrical connecting portion 1 have the same two electrically conductive coating layers 13. In another embodiment (not shown), the heating element 22 can be made of other material which is electrically conductive for heating purposes, such that the electrical connecting portion 1 and the heating element 22 form an electrically conductive loop. Furthermore, the two electrically conductive coating layers 13 are electrically connected to the heating element 22 of the heating unit 2 of the device.

The heating unit 2 according to the present invention is disposed in a mold 3 as show in FIG. 2 and is integrally formed with a lens 4 of the device. The mold 3 includes an insertion groove 31 through which the electrical connecting portion 1 extends. After the electrical connecting portion 1 extends through the insertion groove 31, a plastic material is filled for forming the lens 4. The lens 4 includes a front face 41 and a rear face 42. The heating element 22 is coupled to the rear face 42 of the lens 4. As shown in FIG. 5, the electrical connecting portion 1 can be electrically connected to a circuit board 5 of the device. The circuit board 5 includes an electrical connection end 51 having a slot 52. The electrical connecting portion 1 is inserted into the slot 52 of the electrical connection end 51 for electrical connection with the circuit board 5.

In the present invention, the two electrically conductive coating layers 13 and the two copper layers 121 have excellent engaging reliability through coupling of the two electrically conductive coating layers 13 and the first through-holes 125 of the two copper layers 121.

Figure 6:
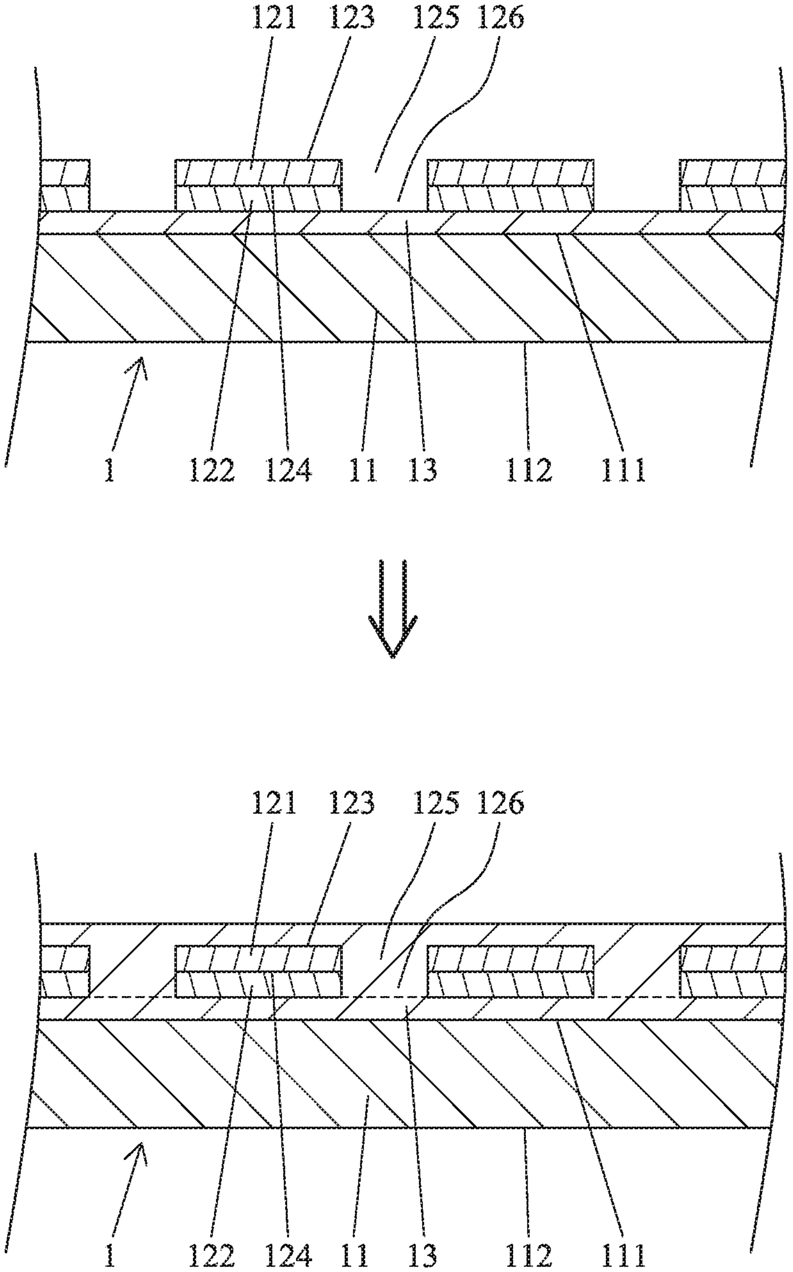
FIG. 6 is a diagrammatic view illustrating production of the electrical connecting portion of the device with the heating function of the first embodiment according to the present invention.

With reference to FIG. 6 which is a diagrammatic view illustrating production of the electrical connecting portion of the device with the heating function of the first embodiment according to the present invention, a method for producing the electrical connecting portion 1 of a device with a heating function will now be described. The electrical connecting portion 1 is a portion of the heating unit 2 of the device 1. The method includes the following steps.

In step S1, a substrate 11 is provided. The substrate 11 is transmittable to light and includes a front face 111 and a rear face 112.

In step S2, two electrically conductive coating layers 13 are disposed. A portion of each of the two electrically conductive coating layers 13 is disposed on the front face 111 of the substrate 11. After curing, an insulating spacing is formed between the two electrically conductive coating layers 13, and the two electrically conductive coating layers 13 are electrically connected to the heating element 22 of the heating unit 2 of the device shown in FIG. 1.

In step S2.5, two glue layers 122 are disposed. Each of the two glue layers 122 is disposed on the portion of the respective electrically conductive coating layer 13 that has cured. Each of the two glue layers 122 includes at least one second through-hole 126 extending in the front-rear direction. Step 2.5 is between step S.2 and step S3.

In step S3, two copper layers 121 are disposed. Each of the two glue layers 122 is disposed between the respective copper layer 121 and the respective electrically conductive coating layer 13. Each of the two cooper layers 121 has a front face 123 and a rear face 124. Each of the two glue layers 122 is coupled to the rear face 124 of the respective copper layer 121. Each of the two copper layers 121 has at least one first through-hole 125 extending in the front-rear direction. Furthermore, each of the two copper layers 121 is disposed on the respective glue layer 122 before curing. The at least one through-hole 125 intercommunicates with the at least one second through-hole 126.

In step S4, another portion of each of the two electrically conductive coating layers 13 is disposed on the respective copper layer 121 and substantially fills the at least one through-hole 125 of the respective copper layer 121 and the at least one through-hole 126 of the respective glue layer 122. After curing, each of the two copper layers 121 is substantially covered by the respective electrically conductive coating layer 13.

Figure 7:
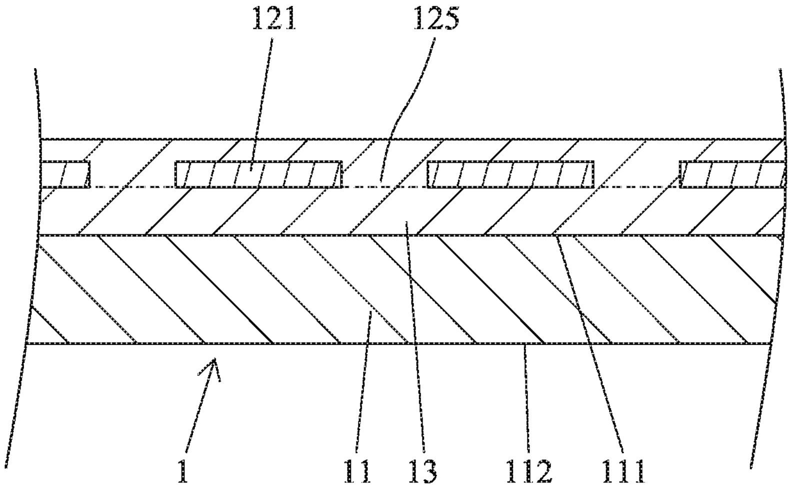
FIG. 7 is a diagrammatic cross sectional view of an electrical connecting portion of a device with a heating function of a second embodiment according to the present invention.

Please refer to FIG. 7 which is a diagrammatic cross sectional view of an electrical connecting portion of a device with a heating function of a second embodiment according to the present invention. The second embodiment is similar to the first embodiment described with reference to FIGS. 1-6, such that the identical or similar portions between the two embodiments will not be described to avoid redundancy. Therefore, only the differences between the first and second embodiments will be described. The two copper layers 121 in step S3 may be disposed on cured portions of the two electrically conductive coating layers 13 by sputtering or evaporation. Namely, the second embodiment does not include the two glue layers 122 in this embodiment.

The two copper layers 121 and the two electrically conductive coating layers 13 of the electrical connecting portion 1 according to the present invention can be respectively connected to the positive electrode and the negative electrode of the power input of the circuit board 5. The two copper layers 121 of the electrical connecting portion 1 according to the present invention are excellent conductors. Thus, after the electrical connecting portion 1 is electrically connected, the current flows into the two copper layers 121 and the two electrically conductive coating layers 13 and then flows into the heating element 22. By the above diversion mechanism, the two copper layers 121 are electrically conductive and reduce the current flowing through the two electrically conductive coating layers 13 to reduce the heat generated by the two electrically conductive coating layers 13. This prevents hot melting of the two electrically conductive coating layers 13 to thereby increase the electrical connection stability while avoiding bad contact.

Figure 8:
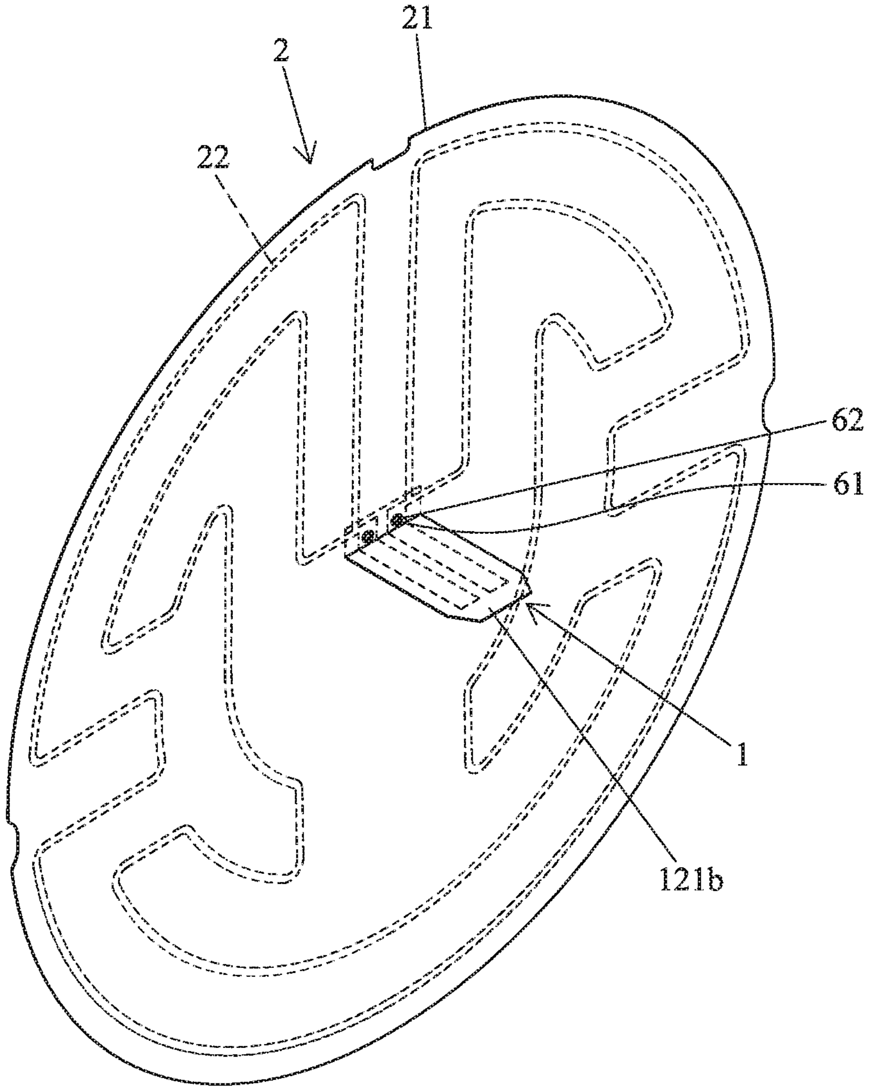
FIG. 8 is a perspective view of a heating unit for a device with a heating function of a third embodiment according to the present invention.
Figure 9:
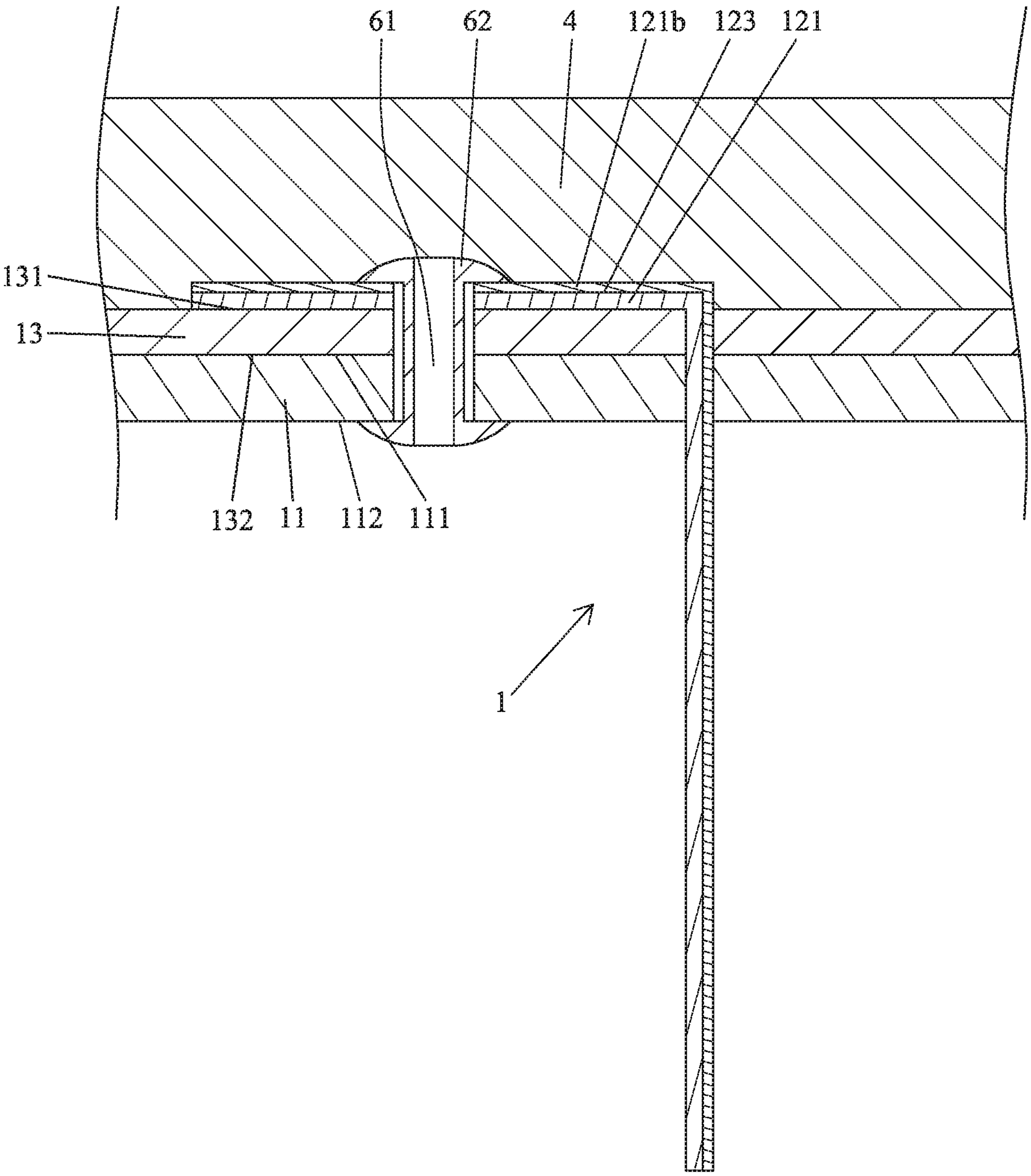
FIG. 9 is a diagrammatic cross sectional view illustrating coupling of a lens and an electrical connecting portion of the device with the heating function of the third embodiment according to the present invention.

FIG. 8 is a perspective view of a heating unit for a device with a heating function of a third embodiment according to the present invention. FIG. 9 is a diagrammatic cross sectional view illustrating coupling of a lens and an electrical connecting portion of the device with the heating function of the third embodiment according to the present invention. With reference to FIGS. 8 and 9, in the third embodiment, the electrical connecting portion 1 is a portion of the heating unit 2 of the device. The electrical connecting portion 1 includes a substrate 11, two electrically conductive coating layers 13, and two copper layers 121. The substrate 11 is made of a light-transmittable material and includes a front face 111 and a rear face 112. Each of the two electrically conductive coating layers 13 is disposed on the front face 111 of the substrate 11, and an insulating spacing is formed after the two electrically conductive coating layers 13 cure. Each of the two electrically conductive coating layers 13 has a front face 131 and a rear face 132. Each of the two coppers 121 is disposed on the front face 131 of the respective electrically conductive coating layer 13, and the two coppers 121 are arranged insulated relative to each other. Furthermore, the two electrically conductive coating layers 13 are electrically connected to a heating element 22 of the heating unit 2 of the device according to the present invention.

The third embodiment is different from the first embodiment in that the two copper layers 121 of the third embodiment do not include the at least one first through-hole 125 and the at least one second through-hole 126 substantially filled by the two electrically conductive coating layers 13 shown in FIG. 4. In this embodiment, each of the two copper layers 121, the respective electrically conductive coating layer 13, and the substrate 11 have aligned through-holes 61 extending in a front-rear direction, and a fastener 62 extends through the aligned through-holes 61. In this embodiment, the fastener 62 is a rivet. Nevertheless, the fastener 62 can be, but not limited to, a bolt or other element. This embodiment further includes a plastic sheet **121*b* having a face coupled with the front faces 123 of the two copper layers 123. In this embodiment, the two copper layers 121** are preferably rolled copper sheets which have better strength and which are bendable and less likely to break. Nevertheless, copper sheets made of other procedures can be used. The present invention is not limited in this regard.

The heating unit 2 of this embodiment can be disposed in the mold 3 to be integrally formed with the lens 4 of the device, as shown in FIG. 2. Since an end of the at least one fastener 62 is formed with the lens 4, an excellent coupling reliability is provided.

Since the electrical connection portion 1 can adopt the copper layers 121 (such as rolled copper sheets), the drawback of hot melting of electrically conductive coating layers can be avoided while providing improved electrical conduction stability. Furthermore, the copper layers 121 (such as rolled copper sheets) of the electrical connection portion 1 of this embodiment are bendable and, thus, less likely to break, an excellent electrical connection can still be achieved when the electrical connecting portion 1 bends to be inserted into the slot 52 of the electrical connection end 51 of the circuit board 5 shown in FIG. 5.

Figure 10:
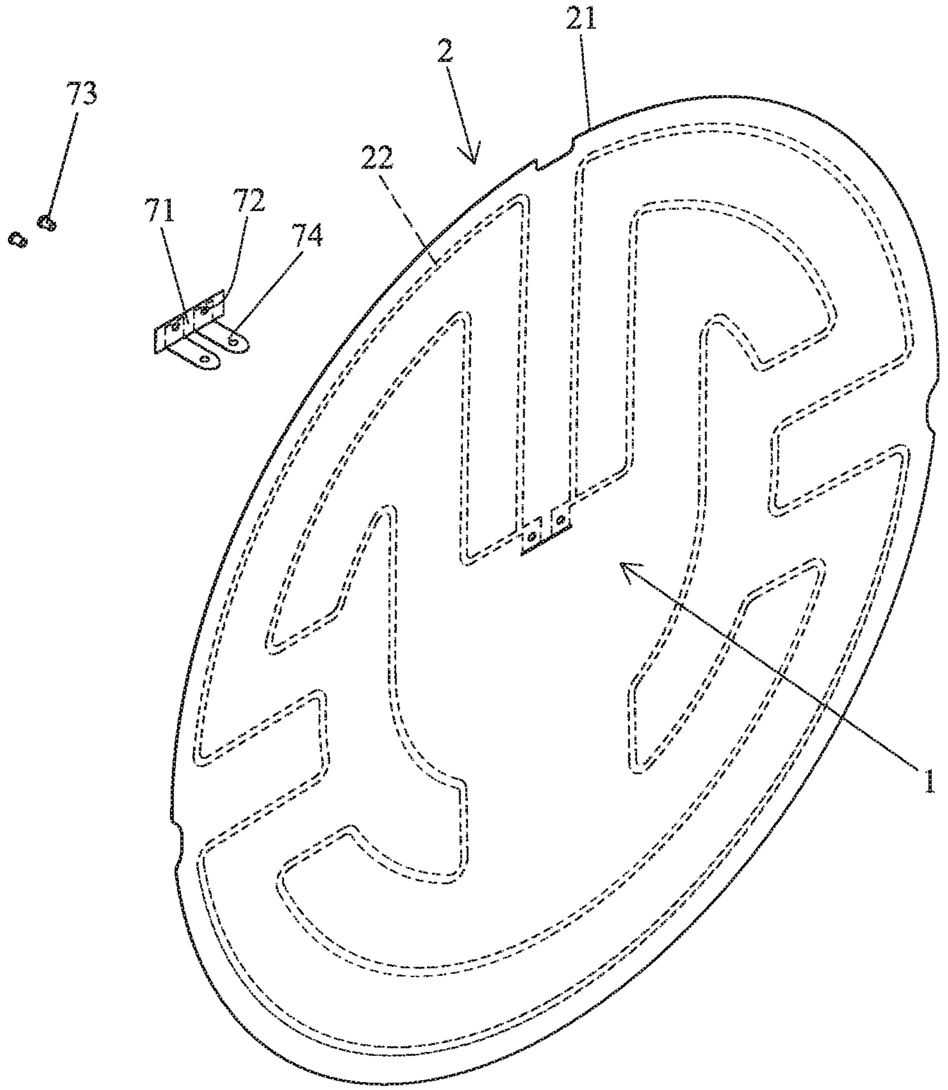
FIG. 10 is a partly-exploded perspective view of a heating unit for a device with a heating function of a fourth embodiment according to the present invention.
Figure 11:
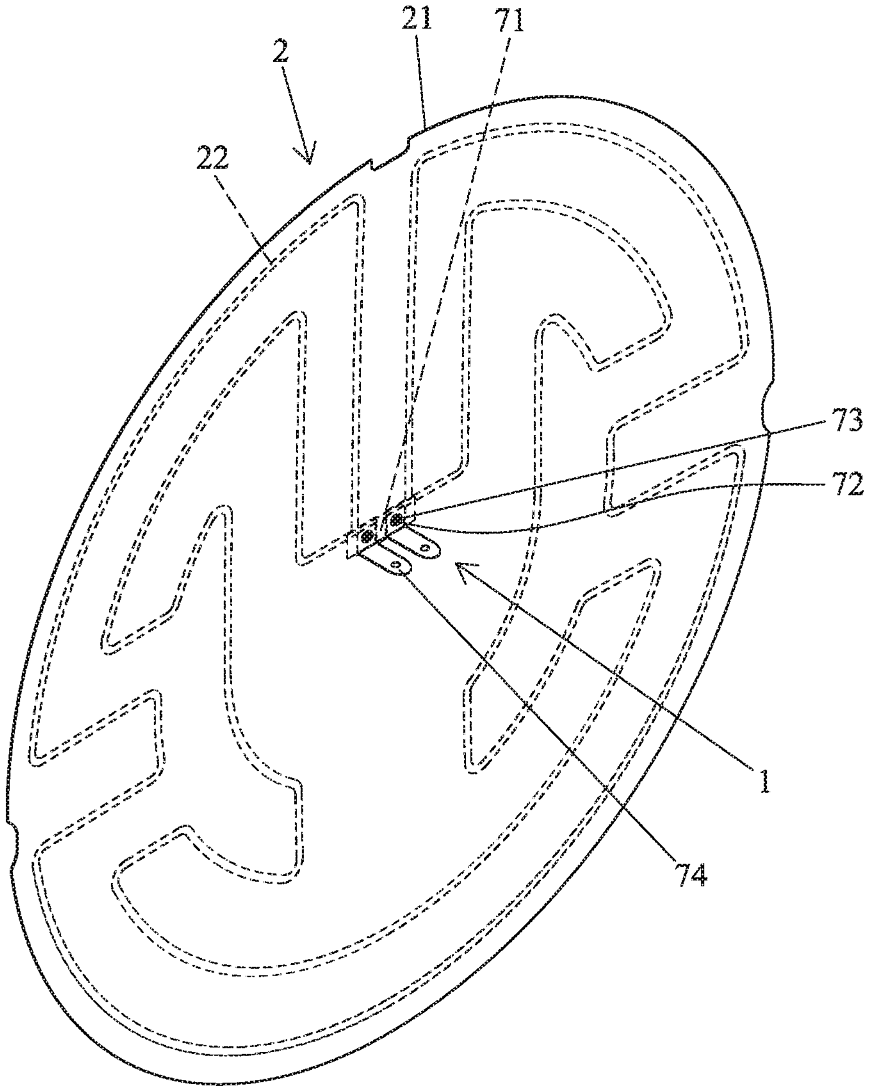
FIG. 11 is a perspective view of the heating unit for the device with the heating function of the fourth embodiment according to the present invention.
Figure 12:
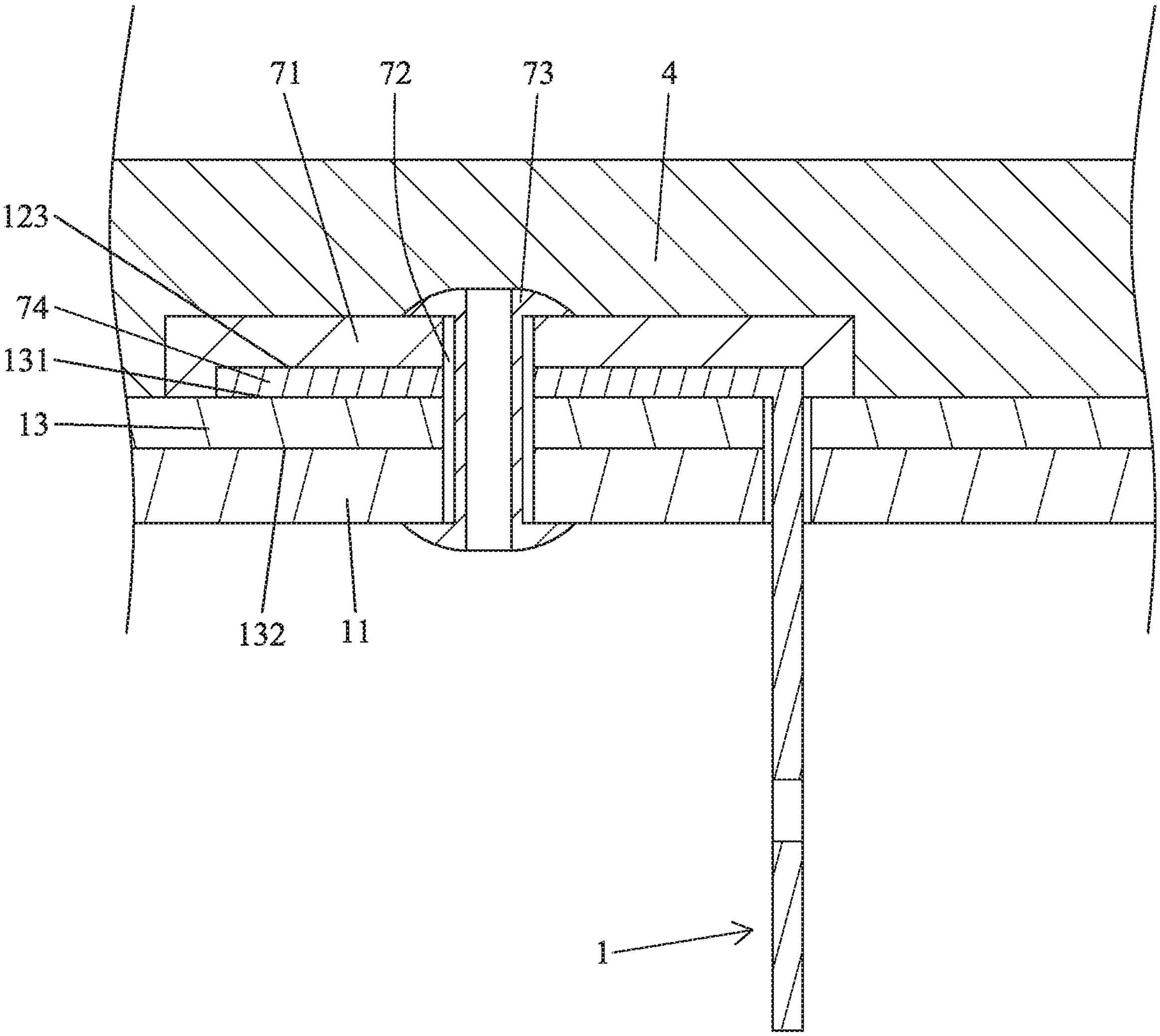
FIG. 12 is a diagrammatic cross sectional view illustrating coupling of a lens and an electrical connecting portion of the device with the heating function of the fourth embodiment according to the present invention.

FIG. 10 is a partly-exploded perspective view of a heating unit for a device with a heating function of a fourth embodiment according to the present invention. FIG. 11 is a perspective view of the heating unit for the device with the heating function of the fourth embodiment according to the present invention. FIG. 12 is a diagrammatic cross sectional view illustrating coupling of a lens and an electrical connecting portion of the device with the heating function of the fourth embodiment according to the present invention. With reference to FIGS. 10-12, the fourth embodiment is similar to the third embodiment, such that the identical or similar portions will not be described to avoid redundancy. Thus, only the differences between the fourth embodiment and the third embodiment will be described. In the fourth embodiment, the electrical connecting portion 1 includes a substrate 11, two electrically conductive coating layers 13, two electrical terminals 74, and a fixing member 71. Each of the two electrical terminals 74 is substantially L-shaped and is made of copper or other metal. Nevertheless, the present invention is not limited in this regard.

The fixing member 71 is made of insulating material and can be used to fix the relative position between the two electrical terminals 74 while providing insulation between the two electrical terminals 74. Thus, the relative position between the two electrical terminals 74 can be fixed by the fixing member 71 to permit easy subsequent insertion of the two electrical terminals 74 into another two electrical terminals with a fixed relative position therebetween. Each of the two electrical terminals 74 is disposed on the front face 131 of the respective electrically conductive coating layer 13. Furthermore, the fixing member 71 is disposed on top of the two electrical terminals 74. Furthermore, each of the two electrical terminals 74, the respective electrically conductive coating layer 13, the fixing member 71, and the substrate 1 have aligned through-holes 72 extending in the front-rear direction, and a fastener 73 extends through the aligned through-holes 72. In this embodiment, the fastener 73 is a rivet. Nevertheless, the fastener 73 can be a bolt or other element. Furthermore, the two electrical terminals 74 can be placed in a mold, and injection molding can be carried out to form the fixing member 71 for fixing the two electrical terminals 74. Nevertheless, the present invention is not limited in this regard.

The heating unit 2 of this embodiment can be placed in the mold 3 to be integrally formed with the lens 4, as shown in FIG. 2. Since an end of the fastener 73 can be formed with the lens 4, excellent coupling reliability can be obtained. Furthermore, since the electrical connecting portion 1 of this embodiment adopts the two electrical terminals 74, the drawback of hot melting of electrically conductive coating layers 13 can be avoided while providing improved electrical conduction stability. Furthermore, the two electrical terminals 74 can be easily coupled with other electrical terminals, providing assembling convenience.

Although specific embodiments have been illustrated and described, numerous modifications and variations are still possible without departing from the scope of the invention. The scope of the invention is limited by the accompanying claims.

The invention claimed is:

1. An electrical connecting portion for a device with a heating function, comprising:

a substrate made of a light-transmittable material and including a front face and a rear face;

two substantially parallel electrically conductive coating layers respectively disposed on the front face of the substrate; and two substantially parallel copper layers respectively disposed on the two substantially parallel electrically conductive coating layers, wherein each of the two substantially parallel copper layers includes at least one first through-hole extending in a front-rear direction corresponding to the substrate; wherein each of the two substantially parallel electrically conductive coating layers substantially covers a respective one of the two substantially parallel copper layers and wherein each of the two substantially parallel electrically conductive coating layers substantially fills the at least one first through-hole of the respective one of the two substantially parallel copper layers.

2. The electrical connecting portion for the device with the heating function as claimed in claim 1, further comprising two substantially parallel glue layers respectively disposed between the two substantially parallel electrically conductive coating layers and the two substantially parallel copper layers, wherein each of the two substantially parallel glue layers is disposed between the respective one of the two substantially parallel copper layers and a respective one of the two substantially parallel electrically conductive coating layers, wherein each of the two substantially parallel copper layers includes a front face and a rear face, wherein each of the two substantially parallel glue layers is coupled to the rear face of the respective one of the two substantially parallel copper layers, wherein each of the two substantially parallel glue layers includes at least one second through-hole extending in the front-rear direction and intercommunicating with the at least one first through-hole, and wherein each of the two substantially parallel electrically conductive coating layers substantially fills the at least one second through-hole of a respective one of the two substantially parallel glue layers.

3. The electrical connecting portion for the device with the heating function as claimed in claim 1, wherein the at least one first through-hole is circular.

4. The electrical connecting portion for the device with the heating function as claimed in claim 1, wherein the device is a vehicle lamp, a dashboard, or an alarm sign.

5. The electrical connecting portion for the device with the heating function as claimed in claim 1, wherein the electrical connecting portion is a portion of a heating unit of the device, and wherein the two substantially parallel electrically conductive coating layers are electrically connected to a heating element of the heating unit.

6. The electrical connecting portion for the device with the heating function as claimed in claim 1, wherein the two substantially parallel electrically conductive coating layers have an insulating spacing therebetween.

7. The electrical connecting portion for the device with the heating function as claimed in claim 1, wherein the electrical connecting portion is an electrical connection end or an electric wire.

8. An electrical connecting portion for a device with a heating function, comprising:

a substrate made of a light-transmittable material and including a front face and a rear face;

at least one electrically conductive coating layer disposed on the front face of the substrate; and at least one copper layer disposed on the electrically conductive coating layer, wherein the copper layer includes at least one first through-hole extending in a front-rear direction corresponding to the substrate;

wherein the electrically conductive coating layer substantially covers the copper layer and fills the first through-hole of the copper layer.

9. The electrical connecting portion for the device with the heating function as claimed in claim 8, further comprising at least one glue layer disposed between the at least one copper layer and the at least one electrically conductive coating layer, wherein the at least one copper layer includes a front face and a rear face, wherein the at least one glue layer is coupled to the rear face of the at least one copper layer, wherein the at least one glue layer includes at least one second through-hole extending in the front-rear direction and intercommunicating with the at least one first through-hole, and wherein the at least one electrically conductive coating layer substantially fills the at least one second through-hole.

10. An electrical connecting portion for a device with a heating function, comprising:

a substrate made of a light-transmittable material and including a front face and a rear face;

two substantially parallel electrically conductive coating layers respectively disposed on the front face of the substrate; and two substantially parallel copper layers respectively disposed on the front face of the two substantially parallel electrically conductive coating layer, wherein each of the two substantially parallel copper layers is disposed on a front face of a respective one of the two substantially parallel electrically conductive coating layers;

wherein each of the two substantially parallel electrically conductive coating layers and the substrate have aligned through-holes extending in a front-rear direction corresponding to the substrate, and wherein a fastener extends through the aligned through-holes; and wherein the two substantially parallel copper layers are arranged insulated relative to each other, wherein each of the two substantially parallel copper layers has at least one aligned-hole which is aligned with the aligned through-holes of the respective one of the two substantially parallel electrically conductive coating layers and the substrate, and wherein the fastener extends through the at least one aligned through-hole of a respective one of the two substantially parallel copper layers.

11. The electrical connecting portion for the device with the heating function as claimed in claim 10, wherein the electrical connecting portion is a portion of a heating unit of the device, wherein the two substantially parallel electrically conductive coating layers are electrically connected to a heating element of the heating unit, and wherein the two substantially parallel electrically conductive coating layers have an insulating space therebetween.

12. The electrical connecting portion for the device with the heating function as claimed in claim 10, wherein the fastener is a rivet.

13. The electrical connecting portion for the device with the heating function as claimed in claim 10, further comprising a plastic sheet having a face coupled to two front faces of the two substantially parallel copper layers.

14. The electrical connecting portion for the device with the heating function as claimed in claim 13, wherein the two substantially parallel copper layers are rolled copper sheets.

15. The electrical connecting portion for the device with the heating function as claimed in claim 10, further comprising two electrical terminals and a fixing member, wherein the fixing member fixes a relative position between the two electrical terminals to provide insulation between the two electrical terminals, and wherein the two electrical terminals are electrically connected to the two substantially parallel electrically conductive coating layers.

16. The electrical connecting portion for the device with the heating function as claimed in claim 15, wherein each of the two electrical terminals and the fixing member have aligned through-holes which are aligned with the aligned through-holes of the respective one of the two substantially parallel electrically conductive coating layers and the substrate, and wherein the fastener extends through the aligned through-holes of the respective one of the two electrical terminals and the fixing member.

17. The electrical connecting portion of the device with the heating function as claimed in claim 10, wherein the devices is a vehicle lamp, a dashboard, or an alarm sign.

* * * * *